(12) United States Patent
Martin et al.

(10) Patent No.: US 11,052,655 B2
(45) Date of Patent: Jul. 6, 2021

(54) FLUIDIC DIE CONTROLLER WITH EDGE SHARPNESS MODE

(71) Applicant: HEWLETT-PACKARD DEVELOPMENT COMPANY, L.P., Spring, TX (US)

(72) Inventors: Eric Martin, Corvallis, OR (US); James Gardner, Corvallis, OR (US); Jordi Hernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/612,716

(22) PCT Filed: Jul. 26, 2017

(86) PCT No.: PCT/US2017/043933
§ 371 (c)(1),
(2) Date: Nov. 11, 2019

(87) PCT Pub. No.: WO2019/022731
PCT Pub. Date: Jan. 31, 2019

(65) Prior Publication Data
US 2020/0164635 A1 May 28, 2020

(51) Int. Cl.
*B41J 2/045* (2006.01)
(52) U.S. Cl.
CPC ....... *B41J 2/04536* (2013.01); *B41J 2/04586* (2013.01)

(58) Field of Classification Search
CPC .................. B41J 2/04536; B41J 2/04586
See application file for complete search history.

(56) References Cited

U.S. PATENT DOCUMENTS

| 5,428,377 | A | 6/1995 | Stoffel et al. |
| 6,247,787 | B1* | 6/2001 | Giere .................... B41J 2/2132 347/40 |
| 6,488,354 | B2 | 12/2002 | Hosono |
| 7,695,087 | B2 | 4/2010 | Tsuboi |
| 8,529,004 | B2 | 9/2013 | Hayashi |

(Continued)

FOREIGN PATENT DOCUMENTS

| WO | WO-2012162082 A1 | 11/2012 |
| WO | WO-2015167454 A1 | 11/2015 |

*Primary Examiner* — Thinh H Nguyen
(74) *Attorney, Agent, or Firm* — Dicke Billig & Czaja PLLC (57) ABSTRACT

A die controller to control a fluidic die having a plurality of primitives each including a plurality of nozzles addressed by a same set of addresses. The die controller provides operational data including a series of actuation data groups to the fluidic die to actuate the nozzles to eject fluid to form an article, each actuation data group including a series of fire pulse groups, with each fire pulse group corresponding to a different address of the set of addresses and including a set of actuation data for each primitive and a set of start bits to initiate actuation of the nozzles based on the actuation data of the immediately preceding fire pulse group. The die controller to provide a blank fire pulse group immediately following a last fire pulse group of the series of fire pulse groups of each actuation data group when operating in an edge sharpness mode.

20 Claims, 4 Drawing Sheets

(56) References Cited

U.S. PATENT DOCUMENTS

| | | |
|---|---|---|
| 8,888,216 B2 | 11/2014 | Ito |
| 2009/0079777 A1 | 3/2009 | Nagamura |
| 2017/0043578 A1 | 2/2017 | Goh |

* cited by examiner

FLUIDIC DIE CONTROLLER WITH EDGE SHARPNESS MODE

BACKGROUND

Fluid ejection systems may include a fluidic die having an array of fluid actuators, and a die controller to provide operational data to the fluidic die to control actuation of the fluid actuators to cause ejection of fluid drops from the fluidic die to provide a desired article. Some example fluid ejection systems may be print systems where the fluid may correspond to a printing fluid (e.g., ink) and the fluidic dies may be printheads forming printed images.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Fluid ejection systems may include a fluidic die (or dies), and a controller for controlling ejection of fluid from the fluidic die to provide a desired article. In a case where the fluid is a printing fluid, the fluid ejection system may be implemented as a print system with the fluidic die implemented as a printhead to form printed images, for example. In one example, the controller may include one or more processors (CPUs), memory, firmware, software, and other electronics for communicating with and controlling the fluidic die(s) and other components of the fluid ejection system. In one example, the memory can include volatile (e.g. RAM) and nonvolatile (e.g. ROM, hard disk, floppy disk, CD-ROM, etc.) memory components including computer/processor readable media that provide for storage of computer/processor executable coded instructions, data structures, program modules, and other data for the fluid ejection system.

Fluidic dies may include a number of fluid actuators. The fluidic actuators may include a piezoelectric membrane based actuator, a thermal resistor based actuator, an electrostatic membrane actuator, a mechanical/impact driven membrane actuator, a magneto-strictive actuator, or other suitable element that may cause displacement of fluid in response to electrical actuation. In some examples, a fluid actuator may be disposed in a nozzle, where in addition to the fluid actuator, the nozzle may comprise a fluid chamber and a nozzle orifice, where actuation of the fluid actuator displaces fluid in the fluid chamber to cause ejection of a fluid drop from the nozzle orifice. Accordingly, a fluid actuator disposed in a nozzle may be referred to as a fluid ejector or drop ejector.

In some examples, a fluid actuator may be disposed in fluid channels, chambers, or other suitable structures, which facilitate conveyance of fluid within the fluidic die, such as to nozzle fluid chambers, for example. In such implementations, actuation of a fluid actuator may displace and control movement of fluid to desired locations within the fluidic die. Accordingly, a fluid actuator disposed in a fluidic channel or other such structure may be referred to as a fluid pump or simply as a pump. An actuation event, as used herein, may refer to both individual and concurrent actuation of fluid actuators to cause fluid displacement, including ejection of fluid from the fluidic die.

The plurality of fluid actuators of a fluidic die may be referred to as an array of fluid actuators. In one example, the array of fluid actuators may be arranged in a column. In example fluidic dies, the array of fluid actuators may be arranged in sets or groups of fluid actuators, where each set of fluid actuators may be referred to as a "primitive" or "firing primitive", where a number of fluid actuators in a primitive may be referred to a size of the primitive. In one example, each primitive has a same set of addresses, with each fluid actuator of a primitive corresponding to a different address of the set of addresses. In some examples, electrical, thermal, and fluid operating constraints of a fluidic die may limit which fluid actuators of each primitive may be concurrently actuated for a given actuation event. Arranging fluidic actuators into primitives facilitates addressing and actuation of subsets of fluid actuators of the array of fluid actuators which may be concurrently actuated for a given actuation event to remain within operating constraints of the fluidic die.

By way of example, consider a fluidic die having four primitives, with each primitive having eight fluid actuators and a same set of eight addresses (e.g., 0 to 7), with each fluid actuator corresponding to a different address of the set of addresses. In one case, according to one example, the fluidic die may have operating constraints that limit the number of fluid actuators that may be concurrently actuated for a given actuation event to one fluid actuator per primitive, for example. In such case, for a first actuation event, the fluid actuator corresponding to address "0" of each primitive may be actuated, followed by a second actuation event, where the fluid actuator corresponding to the address "1" of each primitive may be actuated, and so on, until the fluid actuators at each address of each primitive may have been actuated. It is noted that such example is provided for illustrative purposes only and that any number of other implementations are possible.

According to some examples, based on input data representative of an article, the die controller of a fluid ejection system provides operational data to the fluidic die to control the nozzles to eject fluid to form the article. In one example, the die controller provides the operational data to the fluidic die in the form a series of actuation data groups (ADGs), where each ADG includes a series of fire pulse groups (FPGs), with each FPG corresponding to a different address of the set of addresses used to address the actuators of each primitive of the fluidic die. In one example, each FPG includes a set of start bits and a set of actuation data, the set of actuation data including separate actuation data for each of the primitives. In one example, each FPG may further include an address of the set of addresses used to address the actuators of each primitive. In one example, the actuation data comprises a series of fire data bits, with different fire data bits corresponding to each of the primitives.

According to some examples, during operation, the die controller successively provides each FPG of the series of FPGs of each ADG to the fluidic die. For each FPG, the nozzle in each primitive at the address corresponding to the FPG is fired (or not fired) based on the corresponding actuation data upon the fluidic die receiving and recognizing the start bits of the next FPG of the series. In other words, the start bit of one FPG initiates the firing of nozzles of each primitive based on the address and actuation data of the immediately preceding FPG. The firing of the nozzles at each address of each primitive based on the actuation or fire data of a given FPG is referred to as a fire event. In a case where the array of fluid actuators is arranged to form a column, the firing of the fluid actuators in response to all FPGs of a given ADG result in the firing of all fluid actuators of the column.

By way of example, consider the scenario described above where a fluidic die has an array of nozzles arranged in a column, where the nozzles are grouped to form four primitives each having eight nozzles and having a same set of eight addresses (e.g., 0 to 7), and where each nozzle corresponds to a different one of the set of eight addresses. In one example, to control the fluidic die to provide a desired article, the die controller provides a series of ADGs to the fluidic die, each ADG including eight FPGs, with each FPG corresponding to a different one of the eight addresses (0 to 7), and each FPG including a set of start bits and a set of fire data bits, with one fire data bit corresponding to a different one of the four primitives.

According to such scenario, in one example, assuming the FPGs of each ADG are arranged in ascending order by address (in other examples, other orders may be employed), for a given ADG, the actuation data of the FPG corresponding to address "0" is provided to the nozzle corresponding to address "0" of each primitive. Upon receiving the start bits of the next FPG (in this scenario the FPG corresponding to address "1"), the nozzles at address "0" of each primitive are fired based on the previously loaded data the FPG corresponding to address "0", while the actuation data of the FPG corresponding to address "1" is loaded into the nozzle at address "1" of each primitive. Similarly, upon receiving the start bits of the FPG corresponding to address "2", the nozzles corresponding to address "1" of each primitive are fired based on the previously loaded data from FPG "1", and the actuation data of the FPG corresponding to address "2" provided to the nozzle at address "2" of each primitive. For each ADG, this process is repeated for each FPG, with the actuation data of the last FPG of the series of the given ADG (in this scenario, of the FPG corresponding to address "7") being fired upon receiving the starting bits of the first FPG of the next ADG.

In some examples, fluid ejection systems may operate in different types of ejection modes. For instance, according to one example, when operating in a high-speed ejection mode, a die controller may provide operational data to the fluidic die as quickly as possible in order to actuate the nozzles to eject fluid as quickly as possible. In one example, the period (i.e., duration) of each FPG is minimized based on operating limitations of the fluidic die (e.g., data load times, fluid refill rates). In one example, in order to maximize ejection speed, the period each ADG is minimized to equal a sum of the minimized periods of the corresponding series of FPGs, with the FPGs of each ADG being evenly distributed across the period of the ADG. In high-speed mode, while the actuation or ejection speed of the printhead may be maximized, a quality of a resulting article produced by ejected fluid may be less than optimal (e.g., in the case of the fluidic die being a printhead, the quality of the resulting printed image may be less than optimal).

In another instance, a die controller may operate in a low-speed ejection mode. According to one example, when operating in a low-speed ejection mode, a die controller may extend a period of each ADG relative to a high-speed ejection mode. In one case, the period of each ADG is longer than a sum of minimized periods of corresponding series of FPGs. In one example, the period of each FPG of the series of FPGs of each ADG is minimized, with the series FPGs being disposed at one end (e.g., beginning or end) of the ADG. In another example, a period of each FPG is extended so as to be greater than a minimized period, with the periods of the FPGs being evenly distributed across the period of the ADG such that the period of the ADG is equal to a sum of the periods of the corresponding FPGs. Accordingly, in a low-speed ejection mode, also referred to as "graphics mode", the period of each ADG is longer relative to high-speed ejection mode. In low-speed ejection mode, while ejection speed is not maximized, accuracy of ejected fluid drops is improved relative to high speed mode such that a quality of a produced article may be improved (e.g., in the case of the fluidic die being a printhead, the quality of the resulting image is improved, particularly when the image is graphics-intensive).

Figure 1:
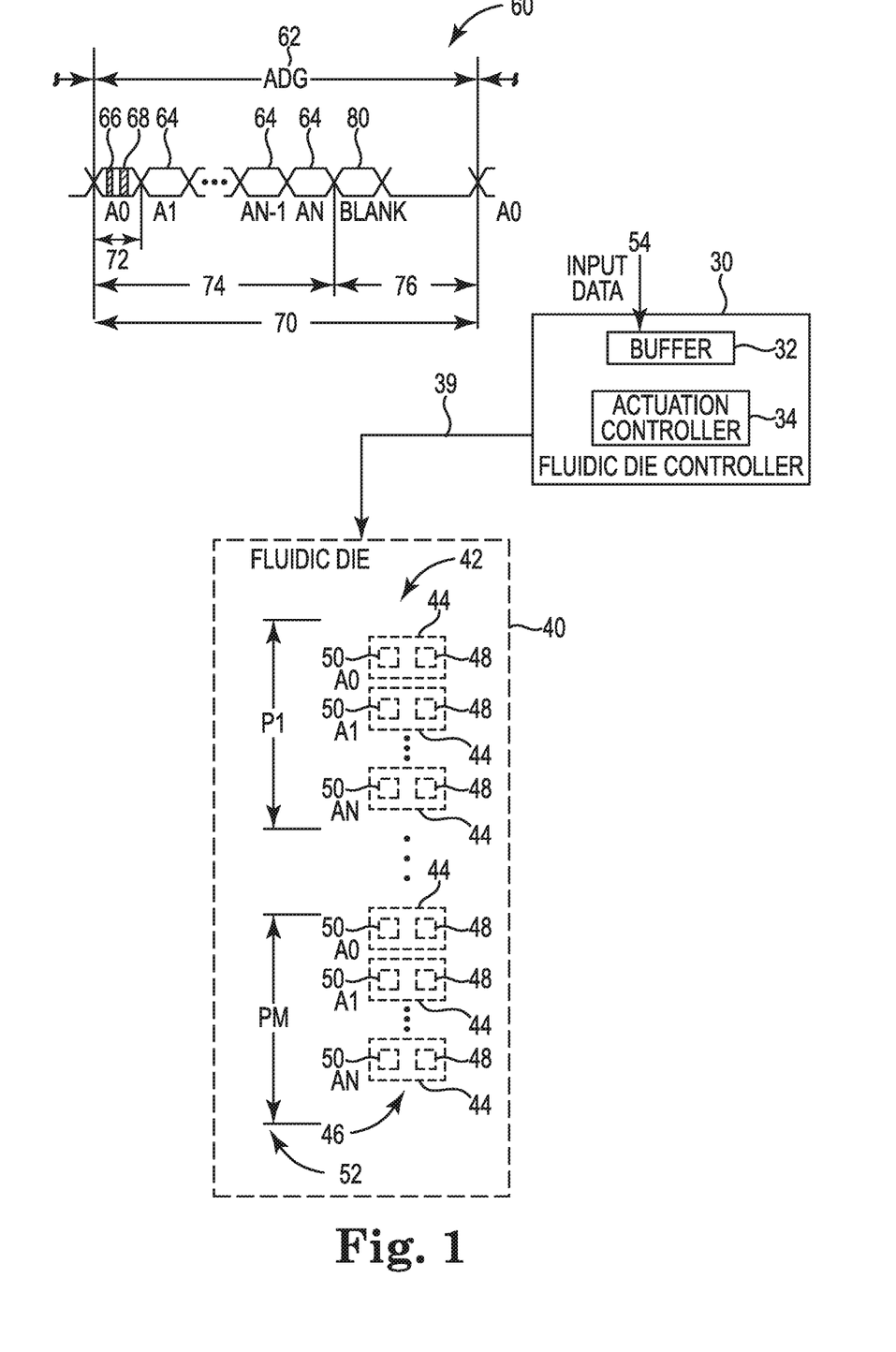
FIG. 1 is a block and schematic diagram generally illustrating a die controller having an edge sharpness ejection mode, according to one example.

FIG. 1 is a block and schematic diagram generally illustrating a die controller 30 having an edge sharpness ejection mode, in accordance with one example of the present application, to provide operational data to control a fluidic die (e.g., fluidic die 40) to provide edge sharpness (i.e., minimize edge roughness) in formed articles, such as edges of straight lines in printed images, for instance, when the fluidic die is configured as a printhead. In one example, fluidic die controller 30 and fluidic die 40 together form a fluidic ejection system, such as print system when fluid die 40 is configured as a printhead.

In one example, die controller 30 includes a buffer 32 and an actuation controller 34. In one instance, fluidic die 40 includes an array 42 of nozzles 44 arranged to form a column 46 of nozzles 44, with each nozzle 44 including a nozzle orifice 48 and a fluid actuator 50 (e.g., a thermal resistor). According to one example, the array 42 of nozzles 44 are grouped to form a plurality of primitives 52, such as primitives P1 to PM, with each primitive 52 including a plurality of nozzles 44, with the plurality of nozzles of each primitive 52 addressed by a same set of addresses, such as addresses A1 to AN, with each nozzle 44 of each primitive 52 corresponding to a different address of the set of addresses.

In operation, according to one example, buffer 32 of die controller 30 receives input data 54 representative of an article to be formed by operation of fluidic die 40. Based on input data 54, actuation controller 34 provides to fluidic die 40, via a communication path 39, operational data 60 in the form of a series of actuation data groups (ADGs) 62 to fluidic die 40 to control actuation of nozzles 44 to eject fluid to form the article (e.g., via actuation of fluidic actuators 50 to eject fluid from corresponding nozzle orifices 48).

According to one example, each ADG 62 includes a series of fire pulse groups (FPGs) 64, with each FPG 64 corresponding to a different address of the set of addresses A1 to AN, and each including a set of start bits 66 and a set of actuation data 68, with the set of actuation data 66 including an actuation value or non-actuation for each primitive of the plurality of primitives P1 to PM of fluidic die 40. In one example, each FPG 64 may include address data indicating the address of the set of addresses to which the FPG corresponds. In one example, the set of start bits 66 of each FPG 64 initiate actuation of nozzles 44 to eject fluid based on the set of actuation data 66 of the immediately preceding FPG 64 of operational data 60. In other words, according to one example, nozzles 44 of fluidic die 40 are not actuated or fired based on receiving actuation data 68 of a given FPG 64 until the set of start bits 66 of the next FPG 64 of operational data 60 is recognized by fluidic die 40.

Figure 2:
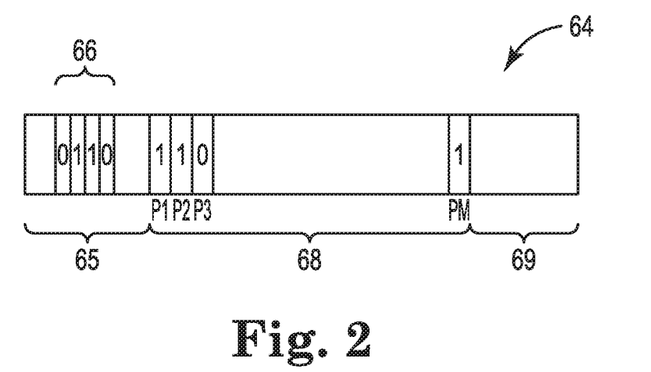
FIG. 2 is a block and schematic diagram generally illustrating a fire pulse group, according to one example.

FIG. 2 is a block diagram generally illustrating an FPG 64, in accordance with one example of the present disclosure. FPG 64 includes a header 65, actuation data set 68, and a footer 69. According to one example, header portion 65 includes the set of start bits 66 where, in one instance, start bits 66 comprise a sequence of bits representing a start detection sequence indicating a beginning of a FPG 64. In one example, header portion 65 may include address data, as described above. In one example, actuation data set 68 includes a series of actuation or firing data bits, each actuation bit corresponding to a different one of the primitives P1 to PM, with each actuation bit having a firing or actuation value (e.g., a value of "1") or a non-firing value (e.g., a value of "0").

Returning to FIG. 1, when selected to operate in edge sharpness mode, actuation controller 34, according to one example, provides operational data 60 having ADGs 62 with a period 70 representative of a low-speed mode (e.g., periods longer than that of high-speed mode), and FPGs 64 with periods 72 representative of a high-speed mode (e.g., FPGs having minimized periods), such that the period 70 of ADG 62 is longer than a combined period 74 of the corresponding FPGs 64. According to one example, as illustrated, the series of FPGs 64 of each ADG 62 are arranged in a leading portion of ADG 70.

By employing ADGs with periods 70 which are akin to slow-speed mode (so that relative motion between nozzles 44 of fluidic die 40 and a surface onto which fluid is to be ejected is slow relative to high-speed mode), and by employing FPGs with minimized periods 72 which are akin to high-speed mode, fluid drops are ejected from nozzles 44 as quickly as possible in response to actuation data 68 while motion of nozzles 44 relative to an ejection target surface is relatively slow (i.e., relative to high-speed mode). The combination of high-speed ejection from nozzles 44 with low-speed movement of fluidic die 40 relative to a target surface provides sharp edges in formed articles, such as the edges of text and lines when fluidic die 40 is a configured as printhead ejecting a printing fluid, for example.

However, because the period 70 of ADG 62 is longer than a combined period 74 of the corresponding series of FPGs 64, a gap or a delay 76 exists between the last FPG 64 of a given ADG 62 and the first FPG 64 of the next ADG 62. In the illustrated example, delay 76 is between the FPG 64 corresponding to address AN of one ADG 62 and the first FPG 64 corresponding to address A1 of the next ADG 62. While the FPGs 64 of ADGs 62 are illustrated as being in ascending order by address, it is noted that the FPGs 64 may be in any suitable order.

Because the nozzles 44 of fluidic die 40 are not actuated to eject fluid in response to actuation data 68 of a given FPG 64 until the start bits 66 of the next FPG 64 are recognized by fluidic die 40, delay 76 results in a delay as to when nozzles 44 are fired in response to actuation data 68 of the last FPG 64 of an ADG 62 relative to the preceding FPGs. While a timing or frequency in firing nozzles 44 in response to actuation data 68 is the same between all FPGs 64 preceding the last FPG 64 of an ADG 62, the timing in firing nozzles 44 between the last FPG and the immediately preceding FPG of an ADG is delayed or extended due to delay 76.

As an illustrative example, with reference to FIG. 1, because no delay exists between each of the FPGs A0 to AN, nozzles 44 are fired at a same frequency in response to the actuation data 68 of FPGs 64 corresponding to addresses A0 to AN−1. However, delay 76 results in a delay in the firing of nozzles 44 in response to the actuation data 68 of FPG 64 corresponding to address AN until the start bits 66 of the first FPG 64 of the next ADG 62 are recognized by fluidic die 40, which causes the firing of nozzles 44 in response to a last FPG 44 of an ADG to be out-of-synch with the firing of nozzles 44 in response to the preceding FPGs of the ADG, and results in undesirable placement of fluid drops ejected by nozzles 44 in response to a last FPG of a series relative to fluid drops ejected in response to the preceding FPGs of the series, thereby resulting in an ejection artifact (e.g., an image artifact when fluidic die 40 is a printhead).

Figure 3:
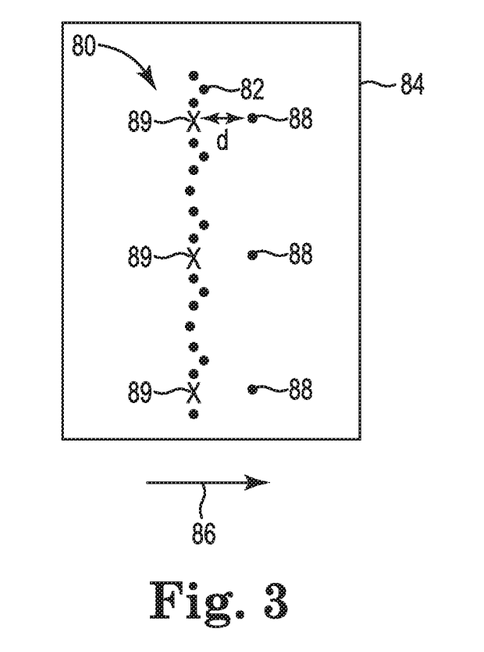
FIG. 3 generally illustrates fluid drops ejected by nozzles of a fluidic die onto a surface, according to one example.

FIG. 3 is an illustration showing a row 80 of fluid drops 82 ejected by the nozzles of a fluidic die onto a surface 84, such as by nozzles 44 of fluidic die 40 in response to operational data 60, where directional arrow 86 shows the relative movement of fluidic die 40 to surface 84. It is noted that FIG. 3 illustrates an example implementation where FPGs of an ADG are not arranged in ascending order by address (such as A0 to A7, for example), but are arranged in a non-ascending order (such as A3, A7, A0, A4, A1, A5, A2, and, A6, for example) In FIG. 3, while fluid drops 82 are generally disposed along a vertical line on surface 84, drops 88 represent drops fired by nozzles 44 in response to a last FPG of an ADG, such as FPG 64 corresponding to address AN in FIG. 1, where delay 76 results in fluid drops 88 being horizontally offset from the remaining fluid drops 82, thereby resulting in an ejection artifact. In the absence of delay 76, a fluid drop ejected by a last FPG of an ADG would be expected or would be desired to be disposed at a position illustrated by an "X", as indicated at 89. As such, delay 76 results in an ejection artifact where drop 88 is offset from a desired location 89 by a distance "d" in FIG. 3.

Returning to FIG. 1, according to one example of the present disclosure, when selected to operate in an edge sharpness mode, to eliminate delay 76, and thus eliminate the delay in the firing of nozzles 44 in response to actuation data 68 of the last FPG 64 of an ADG 62, for each ADG 62 of the series of ADGs forming operational data 60, fluidic die controller 30 provides a blank FPG 80 immediately following the final FPG 64 of the series of FPGs. The blank FPG 80 may correspond to any one of the addresses of the set of addresses, A1 to AN, and includes start bits 66 which initiate the firing of the nozzles to eject fluid drops based on the actuation data in the final FPG 64 of the series of FPGs, while including actuation data 68 that is blank (i.e., actuation data 68 has non-actuation values, such as values of "0", for example, for each primitive). By inserting blank FPG 80 after a final FPG 64 of each ADG 60 when operating in edge sharpness mode, the delay 76 is eliminated and the firing of nozzles 44 in response to actuation data 68 of the final FPG 64 of an ADG 62 is in-sync with and at a same frequency of the firing of nozzles 44 in response to the preceding FPGs 64 of the APG 62, thereby eliminating ejection artifacts that might otherwise result from delay 76.

By providing operational data having ADGs with longer periods (akin to low-speed mode) combined with FPGs having minimized periods (akin to high-speed mode) which are grouped into a leading portion of the ADG period, fluidic die controller 30 selected to operate in edge sharpness mode controls nozzles 44 of fluidic die 40 to maximize edge sharpness of formed articles, such as edges of text or straight lines, for instance, when fluidic die 40 is configured as a printhead ejecting a printing fluid, for example.

In one example, via an input to fluidic die controller 30, a user may select a mode of operation in which to operate fluidic die 40. For instance, a user may select to operate fluidic die 40 in a high-speed mode, a graphics mode, or an edge sharpness mode. In one example, actuation controller 34 may automatically select between graphics mode and edge sharpness mode based on characteristics of input data 54. For instance, in one case, input data 54 automatically selects to operate fluidic die 40 in edge sharpness mode if input data 54 includes data characteristic of a number of straight lines, unless another mode of operation has been selected by a user, for example.

Figures 4, 5:
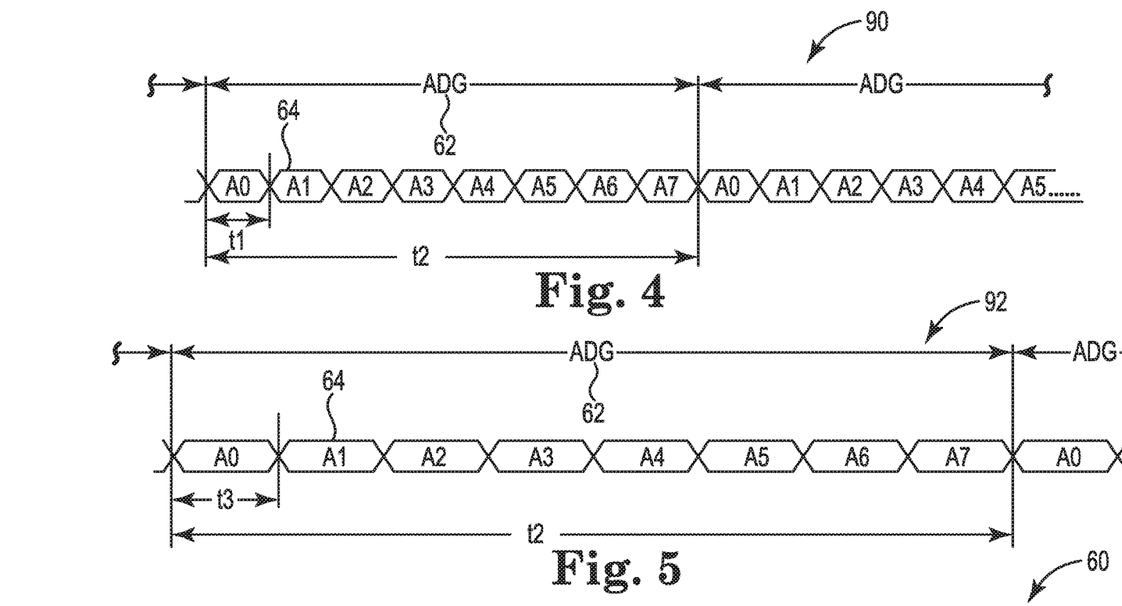
FIG. 4 is a block and schematic diagram generally illustrating operational data for a high-speed ejection mode, according to one example.
FIG. 5 is a block and schematic diagram generally illustrating operational data for a low-speed ejection mode, according to one example.
Figure 6:
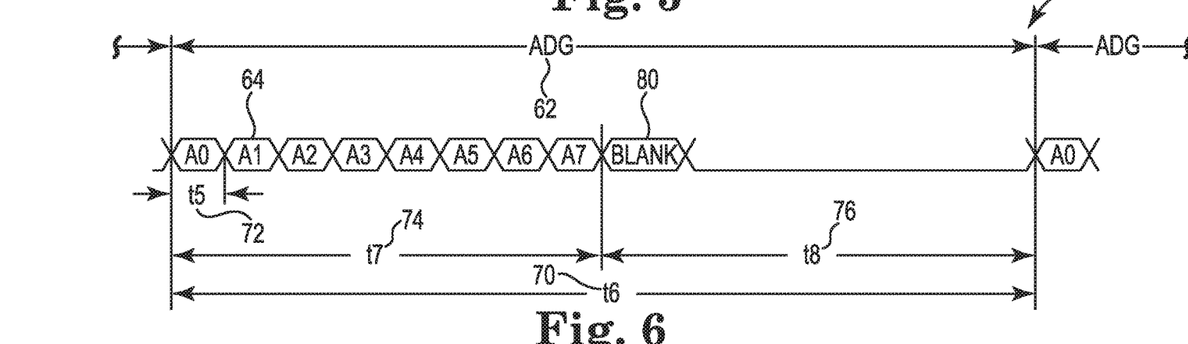
FIG. 6 is a block and schematic diagram generally illustrating operational data for an edge-sharpness ejection mode, according to one example.

FIGS. 4-6 respectively illustrate examples of operational data provided by fluidic die controller 30 to control fluidic die 40 to provide high-speed ejection mode, low-speed ejection or "graphics" mode, and edge sharpness ejection mode operation. FIGS. 4-6 each represent a same scenario where a fluidic die, such as fluidic die 40, has a plurality of primitives, such as primitives P1 to PM, where each primitive has an array of eight nozzles 44 having a same set of addresses (e.g., A0-A7), and where each nozzle 44 corresponds to a different one of the eight addresses.

FIG. 4 illustrates an example of operational data 90 provided by actuation controller 34 to operate fluidic die 40 in a high-speed ejection mode. High-speed operational data 90 includes a series of ADGs 62, with each ADG 62 including a series of FPGs 64, and with each FPG 64 corresponding to a different one of the eight addresses, A0 to A7. In high-speed mode, according to one example, ADG 62 has a minimized period t2 that is minimized to the sum of the periods t1 of the corresponding series of FPGs 64, where each FPG 64 has a period t1 that is minimized based on operating limitations of fluidic die 40 (e.g., data load times, fluid refill rates). In one example, in high-speed mode, actuation controller 34 provides operational data 60 to fluidic die 40 as quickly as possible to eject fluid from nozzles 44 as quickly as possible.

FIG. 5 illustrates an example of operational data 92 provided by actuation controller 34 to operate fluidic die 40 in a low-speed, graphics mode. Similar to high-speed operational data 90, graphics operational data 92 includes a series of ADGs 62, with each ADG 62 including a series of FPGs 64, and with each FPG 64 corresponding to a different one of the eight addresses, A0 to A7. In graphics mode, according to one example, each FPG 64 has a period t3 that is longer than period t1 of high-speed mode, with the FPGs 64 of each ADG 62 again being evenly distributed across a period t4 of each ADG 62, such that the period t4 is equal to a sum of the periods t3 of the corresponding FPGs 64.

FIG. 6 illustrates an example of operational data 60 provided by actuation controller 34 to operate fluidic die 40 in edge sharpness mode, in accordance with the present disclosure, such as illustrated by FIG. 1 above. Again, similar to high-speed operational data 90 and low-speed operational data 92, edge sharpness operational data 60 includes a series of ADGs 62, with each ADG 62 including a series of FPGs 64, and with each FPG 64 corresponding to a different one of the eight addresses, A0 to A7. However, in contrast to high-speed and low-speed operational modes, in edge sharpness mode, the period t6 of each ADG 62 is representative of low-speed operational data while the period t5 of each FPG 64 is representative of high-speed operational data, such that a sum t7 of the periods of t5 of the series of FPGs 64 is less than the period t6 of ADG 62, resulting in gap 76 having a duration t8 between the last FPG 64 of the series of one ADG 62 (corresponding to address A7 in the example) and the first FPG 64 of the series of the next ADG 62 (corresponding to address A0 in the example).

As described above, to eliminate the delay in the firing of the nozzles of the fluid die in response to the actuation data of the last FPG of a given ADG that would otherwise be caused by the delay t8 between the last FPG of the given ADG and the first FPG of the next ADG, when operating in edge-sharpness mode, operational data 60 includes blank FPG 80 immediately following the last FPG of the ADG. Inclusion of blank FPG 80 eliminates the delay in firing the operational data of the last FPG of the ADG and, thus, eliminates a corresponding ejection artifact, as illustrated by FIG. 3 above.

By employing high-speed FPGs 64 having minimized periods t5 while employing ADGs with low-speed durations t6, edge sharpness operational data 60 optimized edge sharpness in articles formed by nozzles 44 of fluidic die 40. In one example, the series of FPGs 64 of edge-sharpness operational data 60 is located in a leading portion t7 of ADG 62. According to one example, blank FPG 80 may correspond to any one of the set of addresses A0 to A7, and includes blank actuation data 68 for each primitive P1 to PM (see FIG. 2, e.g.).

Figure 7:
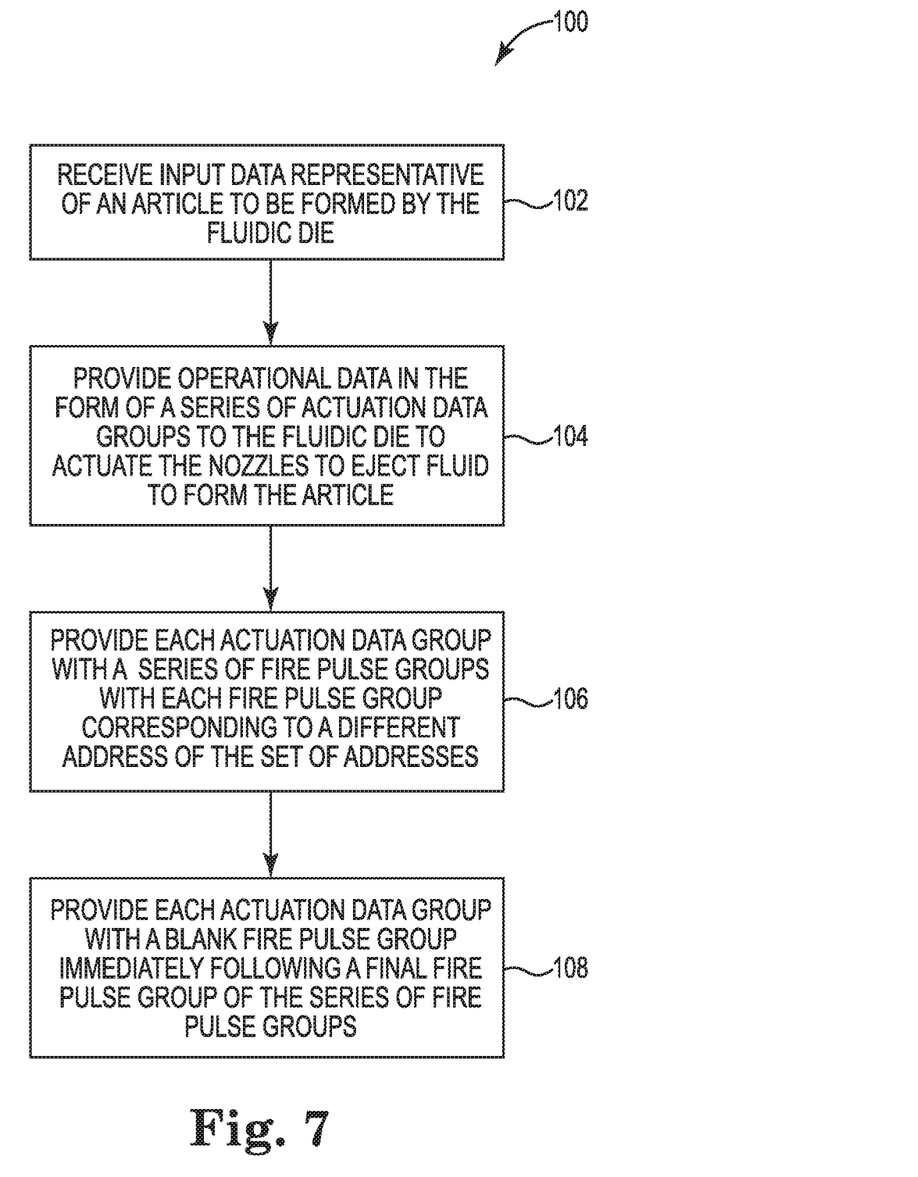
FIG. 7 is a flow diagram generally illustrating a method of operating a fluidic die in an edge sharpness ejection mode, according to one example.

FIG. 7 is a flow diagram generally illustrating a method 100 of operating a fluidic die in an edge sharpness mode, where the fluidic die includes a plurality of primitives, each primitive having a plurality of nozzles addressed by a same set of addresses, such as fluidic die 40 of FIG. 1 including a plurality of primitives P1 to PM, each having an array of nozzles 44 each corresponding to a different address of the set of addresses A0 to AN. At 102, method 100 includes receiving input data representative of an article to be formed by the fluidic die.

At 104, based on the received input data, method 100 includes providing operational data in the form of a series of actuation data groups to the fluidic die to actuate the nozzles to eject fluid to form the article, such as actuation controller 34 of FIG. 1 providing operation data 60 in the form of a series of actuation data groups 62. At 106, method 100 includes providing each actuation data group with a series of fire pulse groups with each fire pulse group corresponding to a different address of the set of addresses, such as fire pulse groups 64 of actuation data group 62 of FIG. 1. At 108, method 100 includes providing each actuation data group with a blank fire pulse group immediately following a final fire pulse group of the series of fire pulse groups, such as actuation controller 34 providing blank fire pulse group 80 in FIG. 1.

In one example, providing each actuation data group includes providing each actuation data group with an actuation period greater than a sum of pulse periods of each fire pulse group of the series of fire pulse groups, such period 70 of ADG 62 being longer than a sum 74 of periods 72 of FPGs 64 in FIG. 1. In one example, providing each actuation data group includes minimizing the pulse period of each fire pulse group based on operating limitations of the fluidic die (e.g., data rates, fluidic constraints). In one case, proving each actuation data group includes positioning the series of fire pulse groups in a leading portion of the actuation period of the actuation data group.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A die controller to control a fluidic die having a plurality of primitives, each primitive including a plurality of nozzles addressed by a same set of addresses, the die controller comprising:
a buffer to receive input data representative of an article; and
an actuation controller, based on the input data, to provide operational data in the form of a series of actuation data groups to the fluidic die to actuate the nozzles to eject fluid to form the article, each actuation data group including a series of fire pulse groups, with each fire pulse group corresponding to a different address of the set of addresses and including:
a set of actuation data having an actuation value or non-actuation value for each primitive; and
a set of start bits which initiate actuation of the nozzles based on the actuation data of the immediately preceding fire pulse group;
when selected to operate in an edge sharpness mode, for each actuation data group, the actuation controller to provide a blank fire pulse group with all actuation data having non-actuation values immediately following a last fire pulse group of the series of fire pulse groups.

2. The die controller of claim 1, each actuation data group having an actuation period and fire pulse group having a pulse period, when selected to operate in edge sharpness mode the actuation controller to provide operational data where a sum of the pulse periods of the series of pulses of an actuation data group is less than the actuation period.

3. The die controller of claim 2, when selected to operate in the edge sharpness mode, the actuation controller to minimize pulse periods based on operational limitations of the fluidic die.

4. The die controller of claim 2, when selected to operate in edge sharpness mode, for each actuation data group, the actuation controller to position the series of fire pulse groups in a leading portion of the actuation period.

5. The die controller of claim 1, the actuation controller selected to operate in edge sharpness mode based on user selection.

6. The die controller of claim 1, the actuation controller to operate in edge sharpness mode based on characteristics of the input data.

7. The die controller of claim 1, wherein the edge sharpness mode comprises operational data having actuation data groups with a period longer than a high-speed mode and fire pulse groups with a period corresponding to the high-speed mode.

8. The die controller of claim 7, wherein a period of the actuation data groups is longer than a combined period of corresponding fire pulse groups.

9. A fluidic ejection system comprising:
a fluidic die having a plurality of primitives, each primitive including a plurality of nozzles addressed by a same set of addresses; and
a fluidic die controller including:
a buffer to receive input data representative of an article; and
an actuation controller, based on the input data, to provide operational data in the form of a series of actuation data groups to the fluidic die to actuate the nozzles to eject fluid to form the article, each actuation data group including a series of fire pulse groups, with each fire pulse group corresponding to a different address of the set of addresses and including:
a set of actuation data having an actuation value or non-actuation value for each primitive; and
a set of start bits which initiate actuation of the nozzles based on the actuation data of the immediately preceding fire pulse group;
when selected to operate in an edge sharpness mode, for each actuation data group, the actuation controller to provide a blank fire pulse group with all actuation data having non-actuation values immediately following a last fire pulse group of the series of fire pulse groups.

10. The fluidic ejection system of claim 9, each actuation data group having an actuation period and fire pulse group having a pulse period, when selected to operate in edge sharpness mode the actuation controller to provide operational data where a sum of the pulse periods of the series of pulses of an actuation data group is less than the actuation period.

11. The fluidic ejection system of claim 9, when selected to operate in the edge sharpness mode, the actuation controller to minimize pulse periods based on operational limitations of the fluidic die.

12. The fluidic ejection system of claim 9, wherein:
the system comprises a high-speed mode for increased output and a slow-speed mode for improved print quality; and
the edge sharpness mode comprising a speed of moving the fluidic die from the slow-speed mode and ejection of fluid from the nozzles at a speed from the high-speed mode.

13. A method of operating a fluidic die in an edge sharpness mode, the fluid die including a plurality of primitives, each primitive having a plurality of nozzles addressed by a same set of addresses, the method comprising:
receiving input data representative of an article to be formed by the fluidic die;
based on the input data, providing operational data in the form of a series of actuation data groups to the fluidic die to actuate the nozzles to eject fluid to form the article, including providing each actuation data group with:
a series of fire pulse groups, each fire pulse group corresponding to a different address of the set of addresses; and
a blank fire pulse group immediately following a final fire pulse group of the series of fire pulse groups.

14. The method of claim 13, for each activation data group:
   providing each fire pulse group with actuation data having an actuation value or non-actuation value for each primitive; and
   providing the blank fire group with actuation data having non-actuation values for each primitive.

15. The method of claim 13, including assigning the blank fire pulse group to any address of the set of addresses.

16. The method of claim 13, including providing each actuation data group with an actuation period greater than a sum of pulse periods of each fire pulse group of the series of fire pulse groups.

17. The method of claim 16, including minimizing the pulse period of each fire pulse group based on operating limitations of the fluidic die.

18. The method of claim 16, including positioning the series of fire pulse groups in a leading portion of the actuation period of the actuation data group.

19. The method of claim 13, wherein the edge sharpness mode comprises operational data having actuation data groups with a period longer than a high-speed mode and fire pulse groups with a period corresponding to the high-speed mode.

20. The method of claim 19, wherein a period of the actuation data groups is longer than a combined period of corresponding fire pulse groups.

* * * * *